United States Patent [19]

Kawaguchi

[11] Patent Number: 4,596,312
[45] Date of Patent: Jun. 24, 1986

[54] DISC BRAKE SYSTEM

[75] Inventor: Takeshi Kawaguchi, Saitama, Japan

[73] Assignee: Honda Giken Kogyo Kabushiki Kaisha, Tokyo, Japan

[21] Appl. No.: 664,776

[22] Filed: Oct. 25, 1984

Related U.S. Application Data

[60] Division of Ser. No. 397,506, Jul. 12, 1982, Pat. No. 4,550,809, which is a continuation-in-part of Ser. No. 340,768, Jan. 19, 1982, abandoned, and a continuation-in-part of Ser. No. 340,770, Jan. 19, 1982, abandoned.

[30] Foreign Application Priority Data

| Jul. 17, 1981 | [JP] | Japan | 56-105317 |
| Jan. 24, 1981 | [JP] | Japan | 56-8584 |
| Jan. 24, 1981 | [JP] | Japan | 56-8585 |
| Feb. 6, 1981 | [JP] | Japan | 56-14957 |
| Feb. 6, 1981 | [JP] | Japan | 56-14958 |
| Jul. 17, 1981 | [JP] | Japan | 56-105319 |
| Jul. 17, 1981 | [JP] | Japan | 56-105318 |
| Jul. 17, 1981 | [JP] | Japan | 56-105320 |

[51] Int. Cl.⁴ .................. B60T 1/06; F16D 55/224; F16D 65/12
[52] U.S. Cl. .................. 188/18 A; 188/71.6; 188/218 A; 188/264 A; 188/344
[58] Field of Search .......... 188/71.6, 18 A, 18 R, 188/264 AA, 218 A, 264 A, 264 P, 264 W, 344, 24.11-24.22; 301/6 WR, 6 A, 6 CS, 6 CF, 6 E; 192/113, 70.12

[56] References Cited

U.S. PATENT DOCUMENTS

| 2,888,102 | 5/1959 | Eksergian | 188/72 |
| 3,059,730 | 10/1962 | Nickell et al. | 188/71.6 |
| 4,062,427 | 12/1977 | Klaue | 188/18 A |
| 4,250,979 | 2/1981 | Kawaguchi | 188/71.6 |

FOREIGN PATENT DOCUMENTS

| 1555186 | 7/1970 | Fed. Rep. of Germany . |
| 1775678 | 11/1971 | Fed. Rep. of Germany . |
| 55-159336 | 12/1980 | Japan . |
| 85841981 | 1/1981 | Japan . |
| 85851981 | 1/1981 | Japan . |
| 1495881 | 2/1981 | Japan . |
| 105319 | 7/1981 | Japan . |
| 105317 | 7/1981 | Japan . |
| 105318 | 7/1981 | Japan . |
| 56-105320 | 7/1981 | Japan . |
| 14957 | 12/1981 | Japan . |
| 547336 | 8/1942 | United Kingdom . |
| 698730 | 10/1953 | United Kingdom . |
| 777124 | 6/1957 | United Kingdom . |
| 844814 | 8/1960 | United Kingdom . |
| 887541 | 1/1962 | United Kingdom . |
| 946126 | 1/1964 | United Kingdom . |
| 1455154 | 11/1976 | United Kingdom . |
| 2031538 | 4/1980 | United Kingdom . |
| 2072280 | 9/1981 | United Kingdom . |

*Primary Examiner*—Douglas C. Butler
*Attorney, Agent, or Firm*—Lyon & Lyon

[57] ABSTRACT

A shielded disc brake system for motorcycles having structure for inducing radial air flow past the brake disc. The device includes an annular passageway between the hub and the shield which may include a centrifugal fan positioned therein. The fan may include passageways between vanes longitudinally aligned with radial passages in the brake disc. The disc itself is mounted about its periphery on bosses extending from the hub. The fan is then bolted to the ends of the bosses to retain the disc from axial movement away from the bosses. Screening members may also be positioned about the periphery of the disc and across inlet ports to provide additional effective closure of the disc brake cavity within the side panel or panels.

9 Claims, 18 Drawing Figures

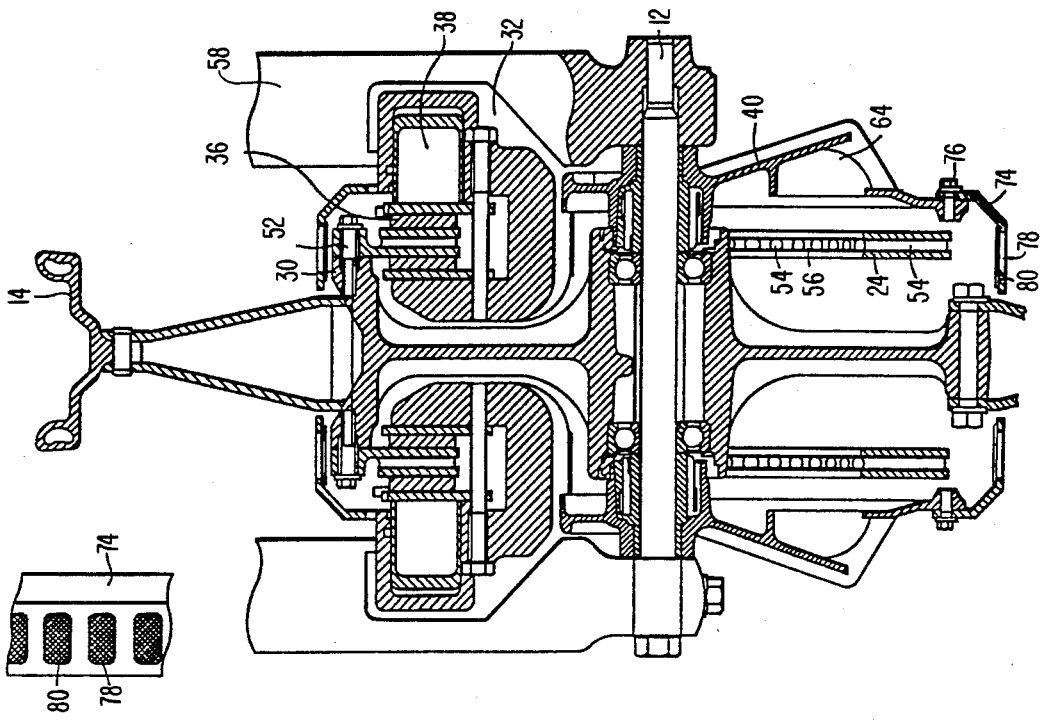
FIG. 14.
FIG. 15.
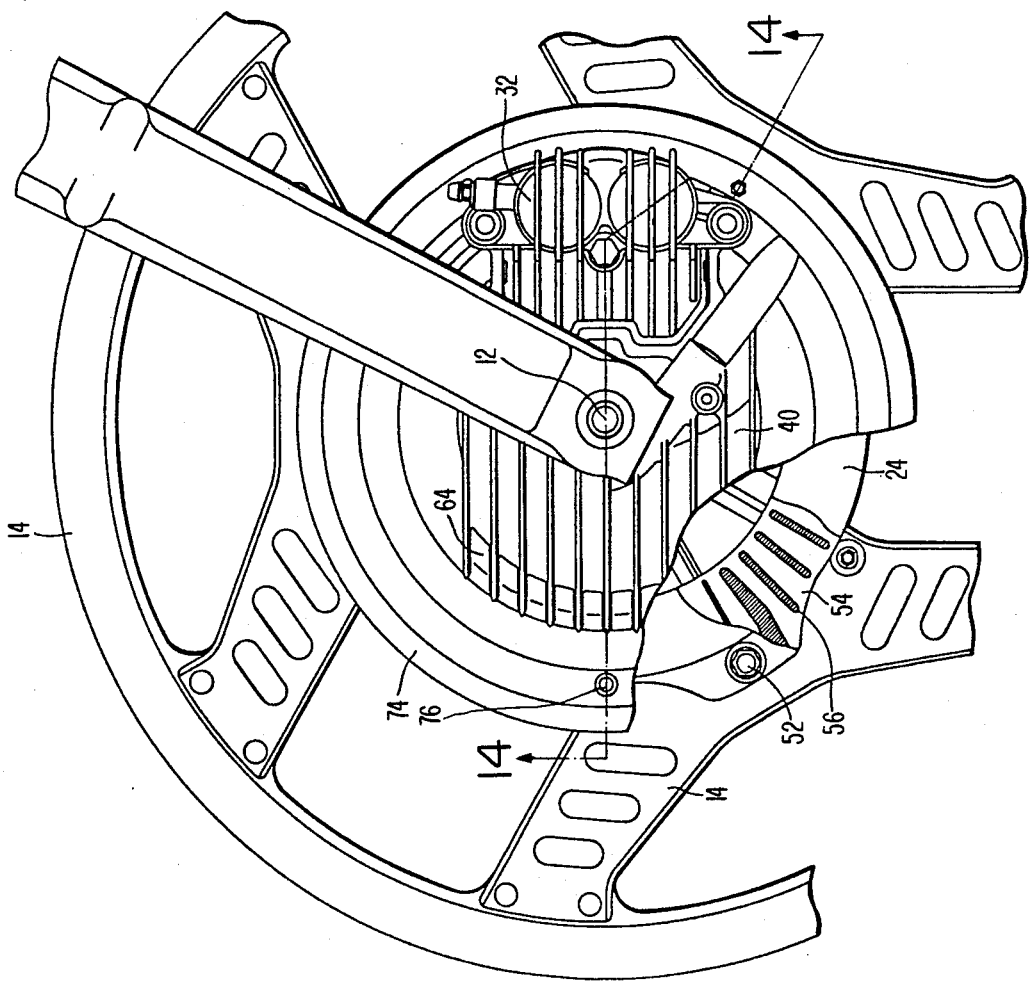
FIG. 13.

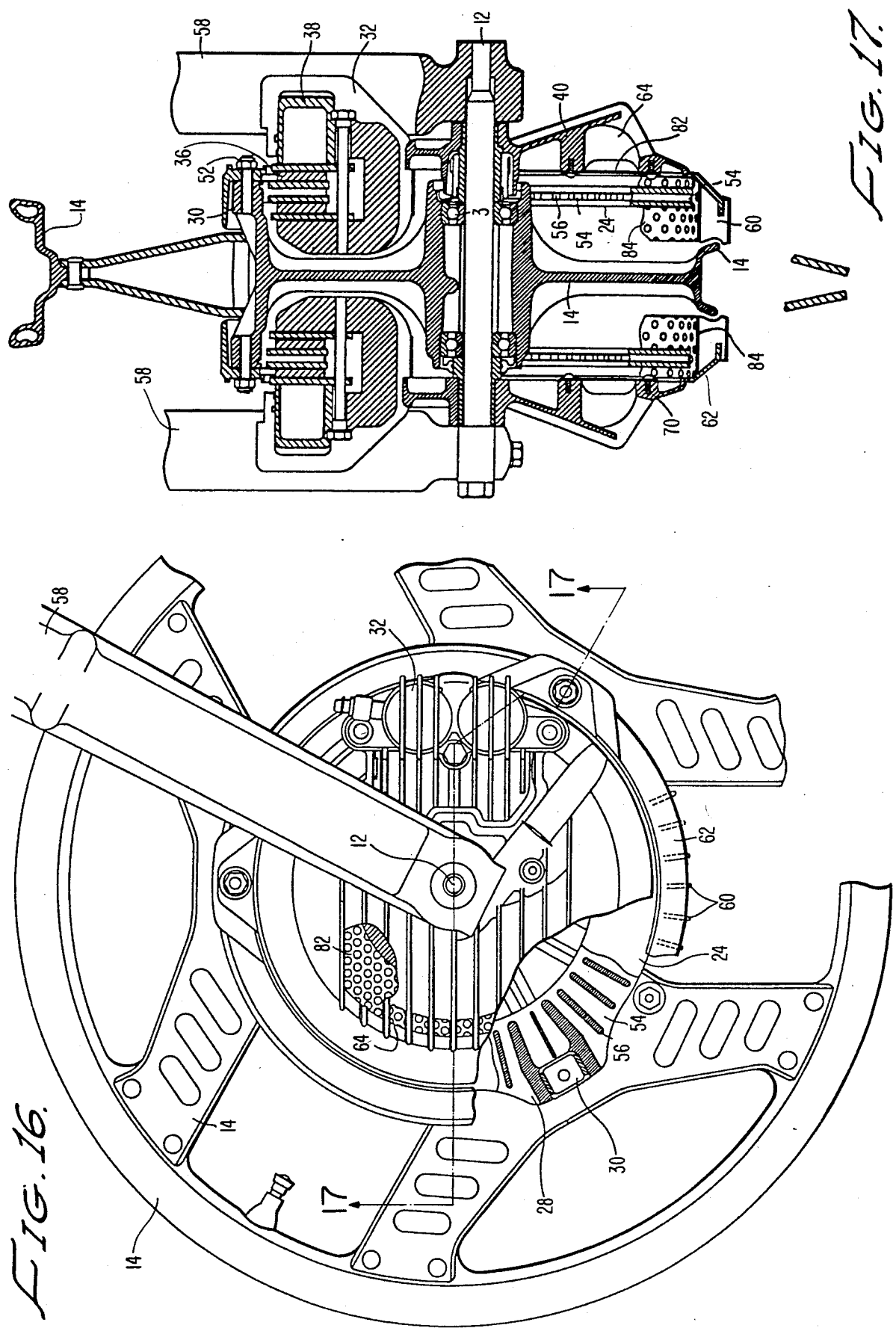

DISC BRAKE SYSTEM

RELATED APPLICATIONS

This is a division of U.S. Patent application Ser. No. 397,506 filed July 12, 1982, now U.S. Pat. No. 4,550,809, which is a continuation-in-part of U.S. Patent application Ser. No. 340,768, filed Jan. 19, 1982 now abandoned, and a continuation-in-part of U.S. Patent application Ser. No. 340,770, filed Jan. 19, 1982, now abandoned.

BACKGROUND OF THE INVENTION

The field of the present invention is braking systems and more specifically disc brake systems generally employed with motorcycles.

In conventional disc brake systems for motorcycles, the brake disc is installed on one or both sides of the wheel hub. These discs are generally exposed to open air so that the heat of friction generated during braking is dissipated at a sufficient rate by the movement of the disc or disc through the air.

Either by design choice or responsive to certain intended applications of the brake, the brake disc may be enclosed between the hub and a side panel. The brake is then shielded from dirt, water and the like to generally reduce wear. In such enclosed systems, the enclosure also acts to shield the brake disc from the open air. Consequently, heat dissipation is reduced. Conventionally, such shielded disc brakes have been made larger than the braking requirements would suggest to reduce the concentration of heat and to increase heat dissipation. Additionally, ventilating of the disc itself has been employed to increase dissipation.

As it is always advantageous to avoid excessive unsprung weight on a vehicle and as it is also advantageous to use small, light components on motorcycles, reduction in the overall size of a disc braking system is considered beneficial. In the event that shielding of a brake disc is also desired, the requirement for larger discs to accommodate the reduced heat dissipation accompanying shielding comes into conflict with the overall goal of reducing component weight. Thus, increased weight has generally been accepted as an unavoidable liability associated with shielded disc brake designs.

The incorporation of intricate features on the disc such as employed with ventilated discs to increase cooling efficiency also has drawbacks. The disc must necessarily be made of thick metal rather than thin metal in view of heat mass considerations. Consequently, the use of even more material in the disc for cooling features is not advantageous for weight considerations. Greater design intricacy also can create problems regarding fabrication and assembly.

Another difficulty associated with brake discs is the mounting of these discs to the hub. When additional cooling features or increased disc diameter are required, it is advantageous to mount the disc at its periphery so that the caliper member may be placed inside to interfere as little as possible with any cooling mechanism or air flow. Furthermore, placement of the calipers on the inside is advantageous on a motorcycle where compact design is important. The earlier mounting design of such externally supported discs is illustrated in FIG. 1 of the drawings. In FIG. 1, a brake disc a is fixed to a mounting boss b on the hub by means of a rod or bolt c extending through a mounting hole d in the brake disc a. An enlarged mounting boss e on the brake disc a was employed to meet with the mounting boss b through which the bolt c passed. The prior art device illustrated in FIG. 1 required that the bolt c be placed under substantial stress during braking. Such designs generally require more component parts and have a tendency to prevent the free thermal expansion of the disc in the radially outward direction.

SUMMARY OF THE INVENTION

The present invention relates to an improved disc brake system for motorcycles of the shielded type which reduces the requirement for the aforementioned substantial increase in weight. To accomplish this result, improved cooling performance is achieved by the present invention without detracting from the shielding so that the brake discs may be smaller in size, approaching the size of brake discs of comparable unshielded systems.

To accomplish the foregoing result, the present invention contemplates means for inducing radially outward air flow about the periphery of the brake disc between the hub and a covering shield or side panel. This means may include a radial flow fan composed of a plurality of vanes annularly spaced outwardly of the disc or simply an annular passage through which air may pass under the influence of the rotational motion of the disc and the hub. Such additions may be made in light alloy separate from the disc itself. In association with the employment of a radial flow fan, a ventilated disc may be employed where the radial passageways through the disc are aligned with the passageways between vanes. In another aspect of the present invention it is also contemplated that the fan may be employed as a means for locking the disc itself into position on the hub, reducing components and the stresses on same.

To further protect the disc and caliper assembly, screening material may be fixed about the periphery of the disc such as at the roots of the fan blades or covering aperatures disposed in an annular arrangement outwardly of the disc. Additionally, screening material may also be employed over the inlet vents to keep out additional dirt. If large pieces of dirt and debris are allowed to enter the inlet vents, it could become trapped within the peripheral screen. This can be avoided with appropriate screening material on the inlet vents. Such material for both locations may be either mesh or perforated plate.

Accordingly, it is an object of the present invention to provide an improved disc brake system for motorcycles. It is a further object to provide a shielded disc brake system which is relatively light in weight and exhibits efficient disc cooling. Other objects and advantages will appear hereinafter.

BRIEF DESCRIPTION OF THE DRAWINGS

FIG. 13 is a side view of a sixth embodiment of the present invention.

FIG. 14 is a cross-sectional view taken along line 14—14 of FIG. 13.

FIG. 15 is a detail view of apertures in an annular portion of the brake shield.

FIG. 16 is a side view of a seventh embodiment of the present invention.

FIG. 17 is a cross-sectional view taken along line 17—17 of FIG. 16.

DETAILED DESCRIPTION OF THE PREFERRED EMBODIMENT

Figure 2:
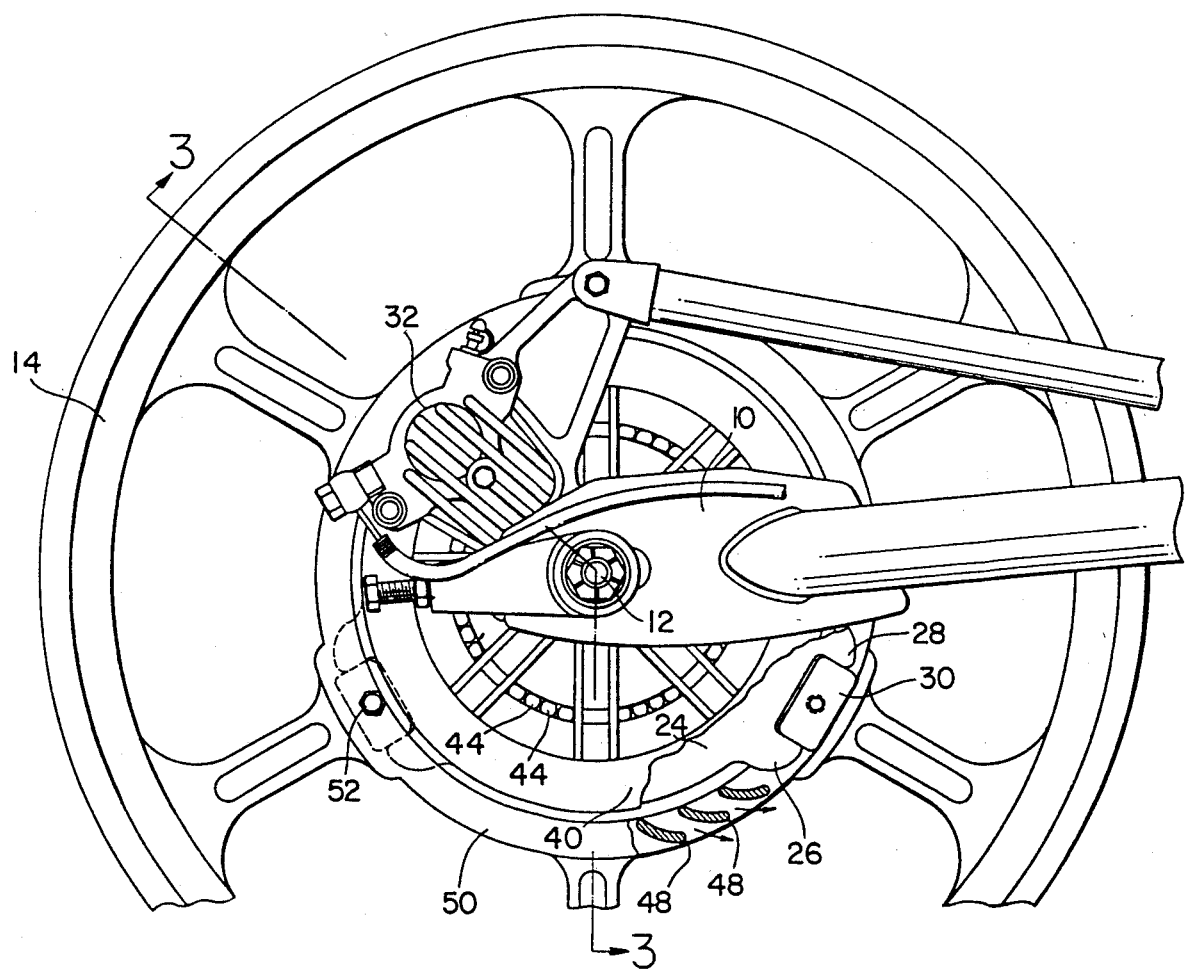
FIG. 2 is a side view of a first embodiment of the present invention illustrating a motorcycle hub and disc brake system.
Figure 3:
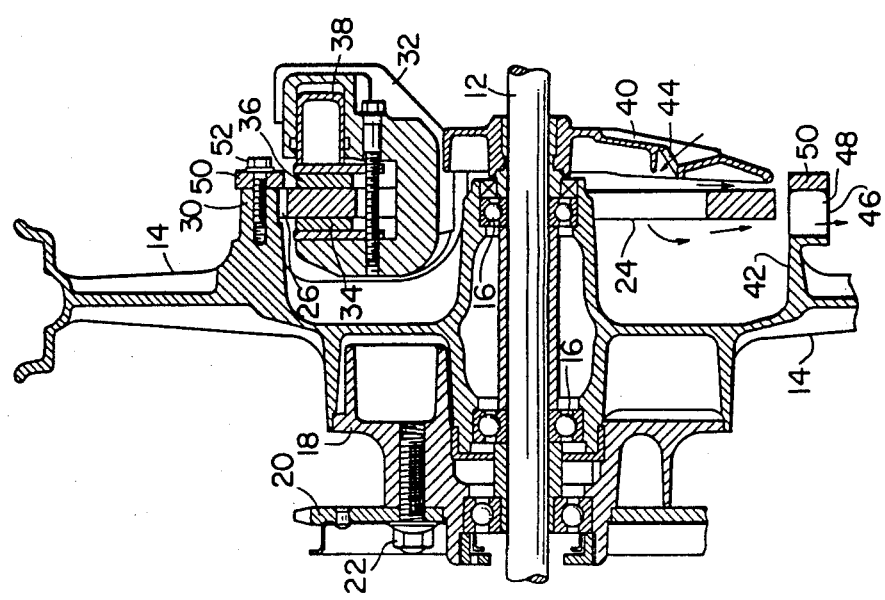
FIG. 3 is a cross-sectional view taken along line 3—3 of FIG. 2.

Turning in detail to the drawings, FIGS. 2 and 3 illustrate the rear wheel assembly of a motorcycle including a rear fork assembly 10, a rear wheel axle 12 and a rear wheel hub 14. The hub 14 is supported by the rear fork assembly 10 and rotatably mounted about the rear wheel axle 12 and a bearing 16. As can best be seen in FIG. 3, a final drive flange 18 is fixed to the hub 14 and includes a driven sprocket 20 bolted to the final driven flange 18 by bolts 22.

On the side of the hub 14 opposite the driven sprocket 20 is a disc brake system including a brake disc 24. The brake disc 24 is mounted at its outer periphery to the hub 14. Three sets of mounting projections 26 and 28 define cutout portions between the projections of each set. The wheel hub 14 includes three bosses 30 which extend laterally toward the brake disc 24 to engage the sets of mounting projections. The fit between the disc 24 and the bosses 30 is loose to accommodate thermal expansion.

Mounted to the rear fork assembly 10 is a caliper member 32. The caliper member is fixed against rotating with the hub 14 and brake disc 24; and includes pads 34 and 36 positioned on either side of the brake disc 24. These pads may be forced into braking engagement with the brake disc 24 upon operation of a caliper piston 38 in a conventional manner. The caliper member spans the disc from the inside for compactness and to avoid interference with disc cooling.

The disc brake system includes a side panel 40 which covers the side of the brake disc 24 away from the hub 14. The side panel 40 extends radially outwardly to adjacent the periphery of the brake disc 24. The hub 14 also extends by means of a flange 42 to adjacent the outer periphery of the brake disc 24. Thus, an annular clearance or passageway is defined between the flange 42 of the hub 14 and the outermost extension of the side panel 40. The surrounding of the brake disc 24 by the hub 14 and its flange 42 and by the side panel 40 prevents the deposit of water, dust and the like on the brake disc.

To promote cooling of the braking system which is subject to frictional heating during use of the brakes, cooling air introduction ports 44 are provided through the side panel 40 inwardly of the brake disc 24. These cooling air introduction ports are positioned such that incoming air will flow radially outwardly past the brake disc 24 as can be seen by the arrows in FIG. 3.

A centrifugal or radial flow cooling fan 46 is positioned radially adjacent to the periphery of the brake disc 24. In the embodiment of FIGS. 2 and 3, the cooling fan is integral with the hub 14 and includes a plurality of vanes 48 which may be arranged for maximum induced radial flow through the annular passageway. In the embodiment of FIGS. 2 and 3, the vanes 48 are integrally formed with the flange 42 of the hub 14. Rotation of the hub 14 by the driving of the motorcycle will cause the vanes 48 to act as a means for inducing radial, outward air flow in a manner consistent with a centrifugal fan. To a certain extent, the mere existence of the annular passageway adjacent the periphery of the brake disc 24 and of the hub 14 and associated flange 42 will create or induce air flow from the cooling air introduction ports, past the brake disc 24 and between the extremities of the side panel 40 and the wheel hub flange 42.

Figure 1:
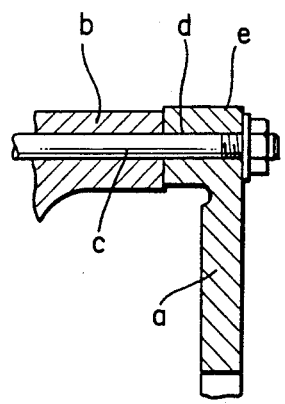
FIG. 1 is a detailed cross-sectional view of a brake disc and mounting boss of the prior art.

A shroud or ring 50 is positioned about the fan 46 to close the distal ends of the vanes 48. This shroud or ring 50 is fixed by fasteners 52 to the mounting bosses 30 of the hub 14. The placement of the ring 50 retains the brake disc 24 in its axial position. The sets of mounting projections 26 and 28 retain the brake disc 24 from rotational movement. Thus, the brake disc is securely positioned in place. The mounting of the brake disc including the mounting projections 26 and 28 about the bosses 30 and the retaining ring or vane shroud 50 is unlike the prior art illustrated in FIG. 1. In the preferred embodiment of the present invention, the mounting projections 26 and 28 provide integral loading on the brake disc 24 rather than through a bolt shaft as in the prior art.

Figure 4:
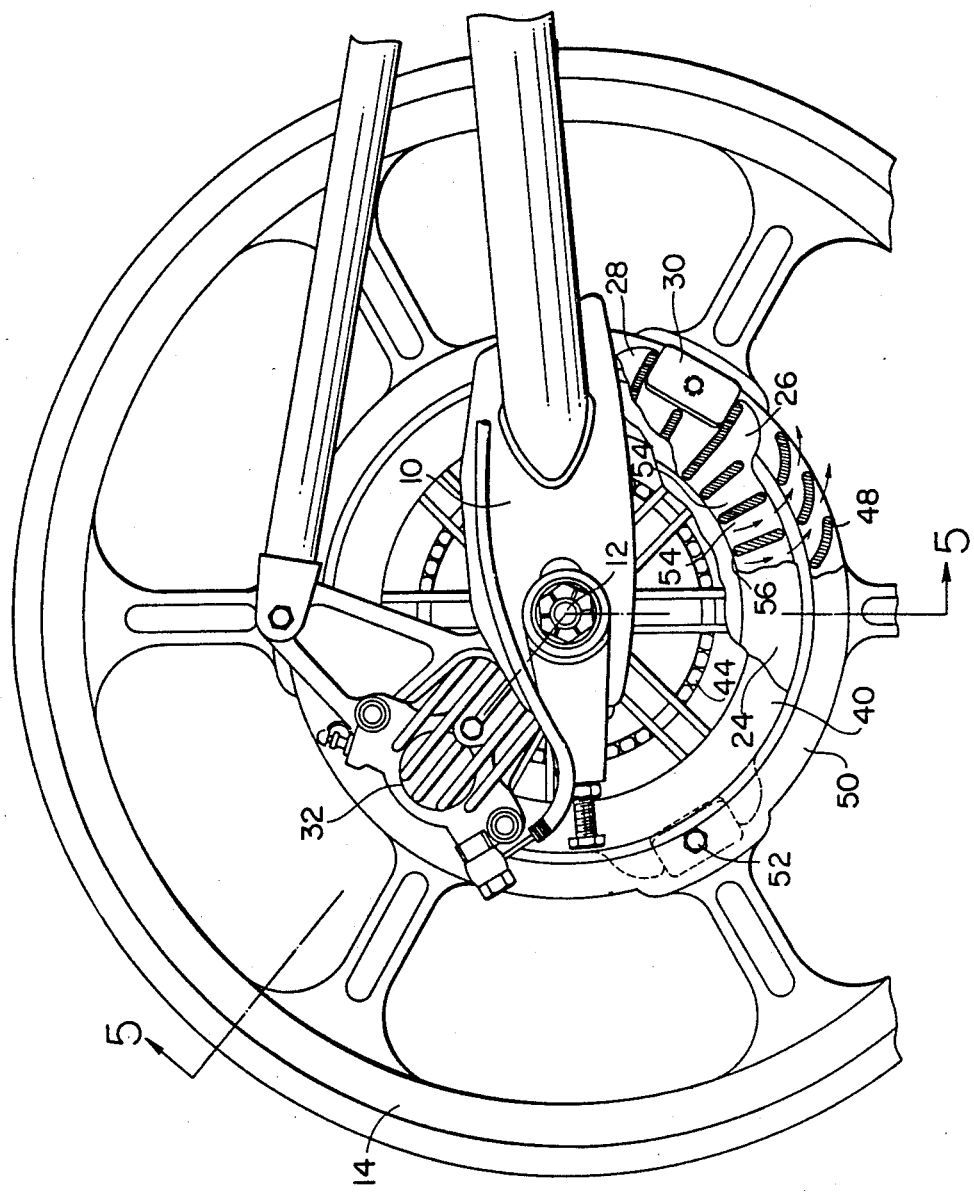
FIG. 4 is a side view of a second embodiment of the present invention.
Figure 5:
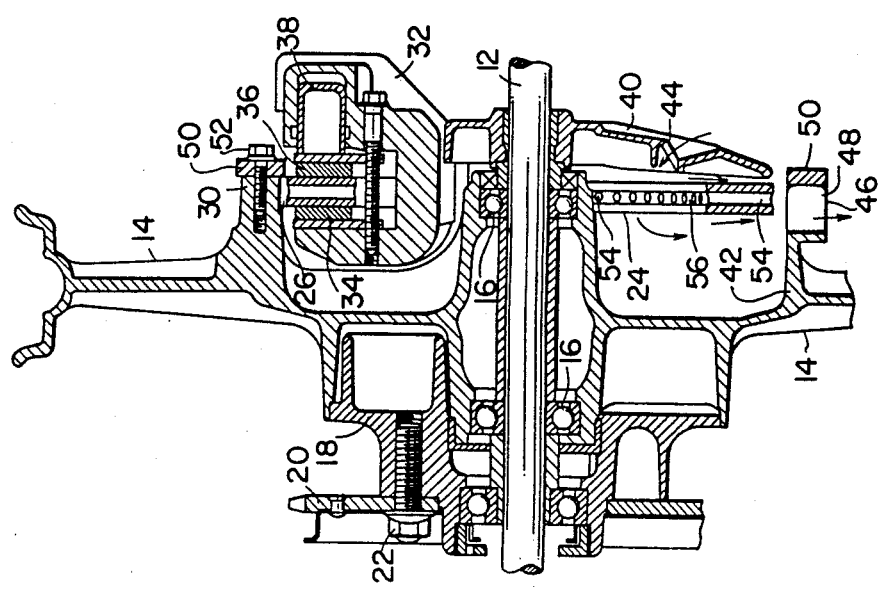
FIG. 5 is a cross-sectional view taken along line 5—5 of FIG. 4.

Looking next to the embodiment of FIGS. 4 and 5, similar reference numerals are employed to designate identical or substantially identical components to those of the embodiment of FIGS. 2 and 3. The additional feature presented in the embodiment of FIGS. 4 and 5 is the employment of a ventilated brake disc 24. The ventilated brake disc includes radial passages 54 extending centrally through the brake disc 24. Webs 56 separate the passages 54 and help to strengthen the disc. The embodiment of FIGS. 4 and 5 further illustrate the longitudinal alignment of the vanes 48 with the webs 56 to create relatively continuous flow paths through the brake disc 24 and through the fan 46.

Figure 6:
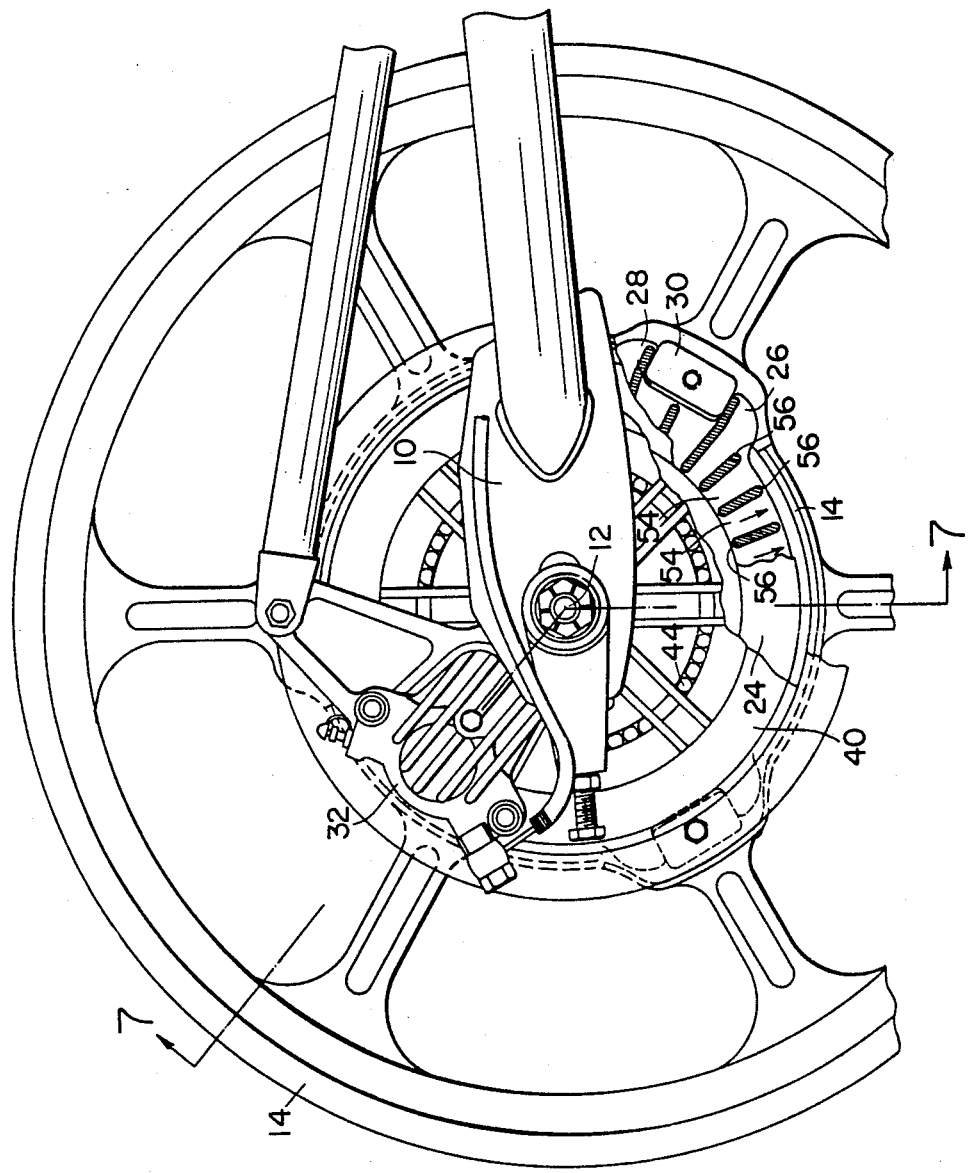
FIG. 6 is a side view of a third embodiment of the present invention.
Figure 7:
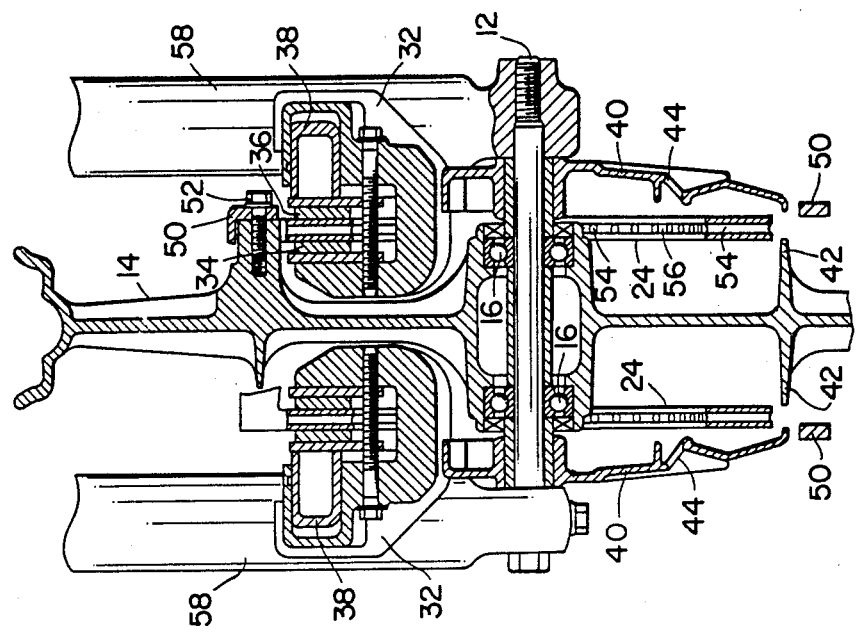
FIG. 7 is a cross-sectional view taken along line 7—7 of FIG. 6.
Figure 8:
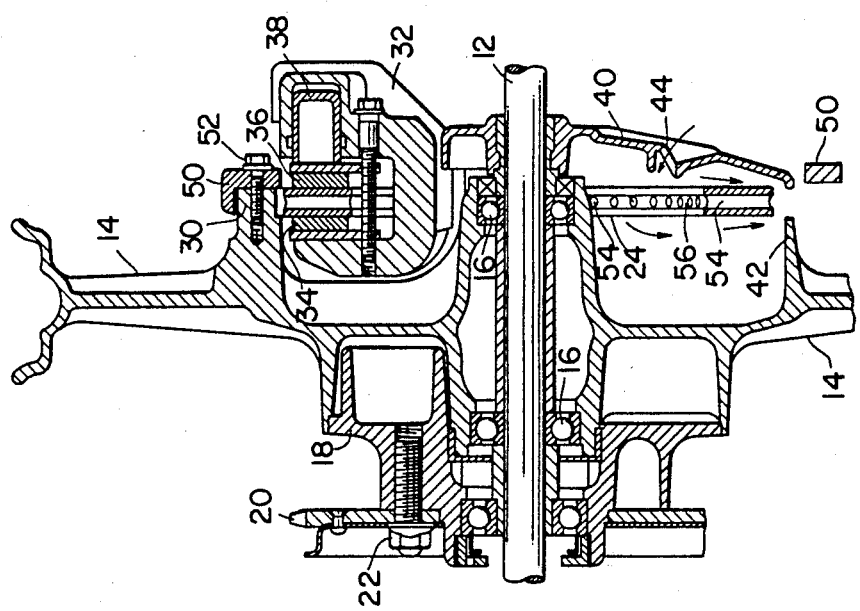
FIG. 8 is an embodiment similar to that of FIGS. 6 and 7 but for the front rather than rear wheel of a motorcycle and incorporating dual discs.

The embodiments of FIGS. 6, 7 and 8 also employ corresponding numbers to the earlier embodiments. In FIGS. 6 and 7, a rear wheel for a motorcycle is disclosed as in the prior embodiments. In FIG. 8, the same air flow scheme is employed on a front wheel device employing dual brake disc 24. Front forks 58 are thus employed in the embodiment of FIG. 8.

The means for inducing radial air flow in the embodiment of FIGS. 6 through 8 is simply the presence of a space between the flange 42 of the hub 14 and the side panel 40. Furthermore, the rotation of the disc 24 and of the hub 14 induce flow from the cooling air introduction ports 44 in a radially outward direction through the passageway between the hub and the side panel. A ring 50 is again bolted to the mounting bosses 30 but does not form a shroud for any vanes of an annular fan.

Figure 10:
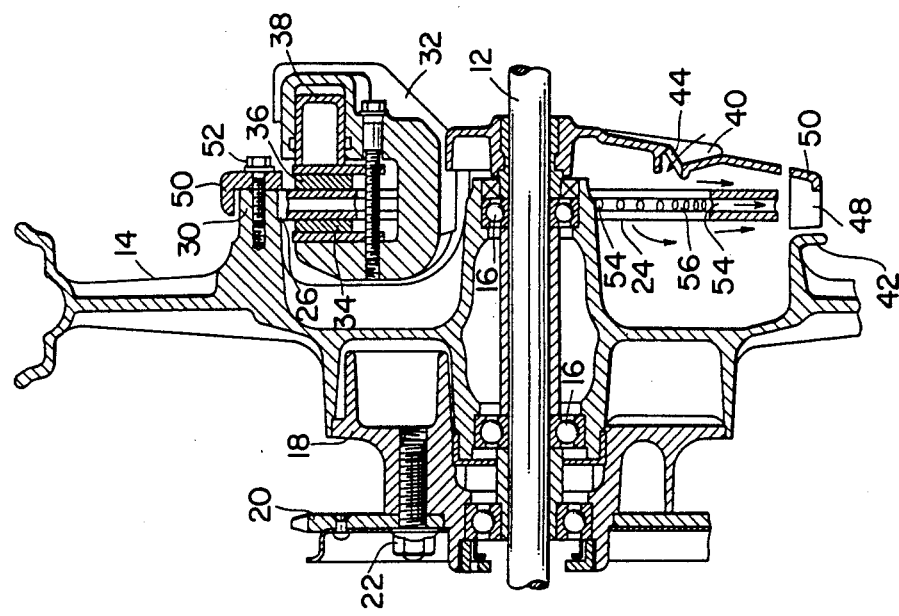
FIG. 10 is a cross-sectional view taken along line 10—10 of FIG. 9.
Figure 9:
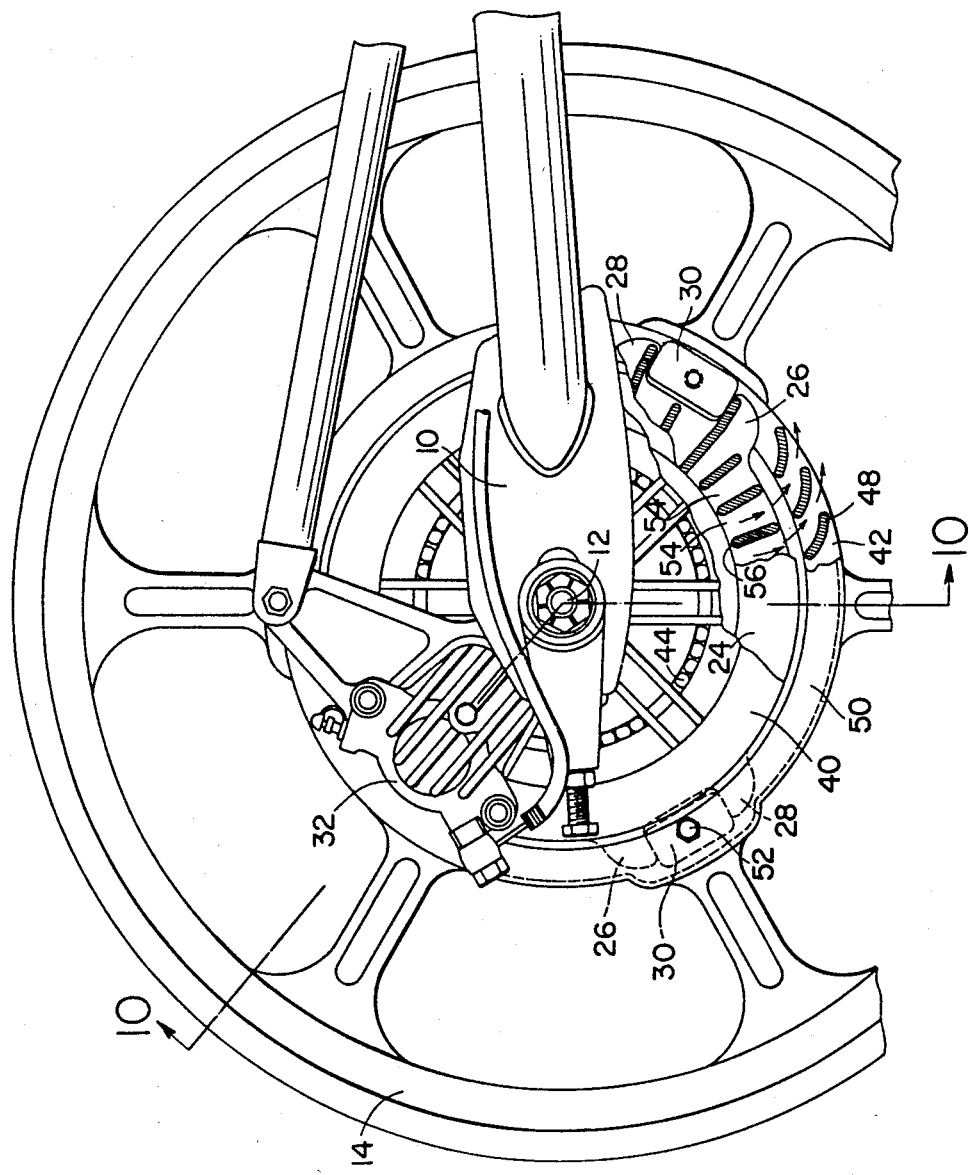
FIG. 9 is a side view of a fourth embodiment of the present invention.

Looking then to the embodiment of FIGS. 9 and 10, corresponding numbers are again employed. In this embodiment, the vanes 48 are integrally associated with the shroud and mounting ring 50. The flange 42 extending from the hub 14 to adjacent the periphery of the disc 24 includes an additional segment extending adjacent the side of the vanes 48 as can best be seen in FIG. 10. By separately forming the fan, the fan may be of any appropriate material rather than the specific light alloy of the hub.

Figure 12:
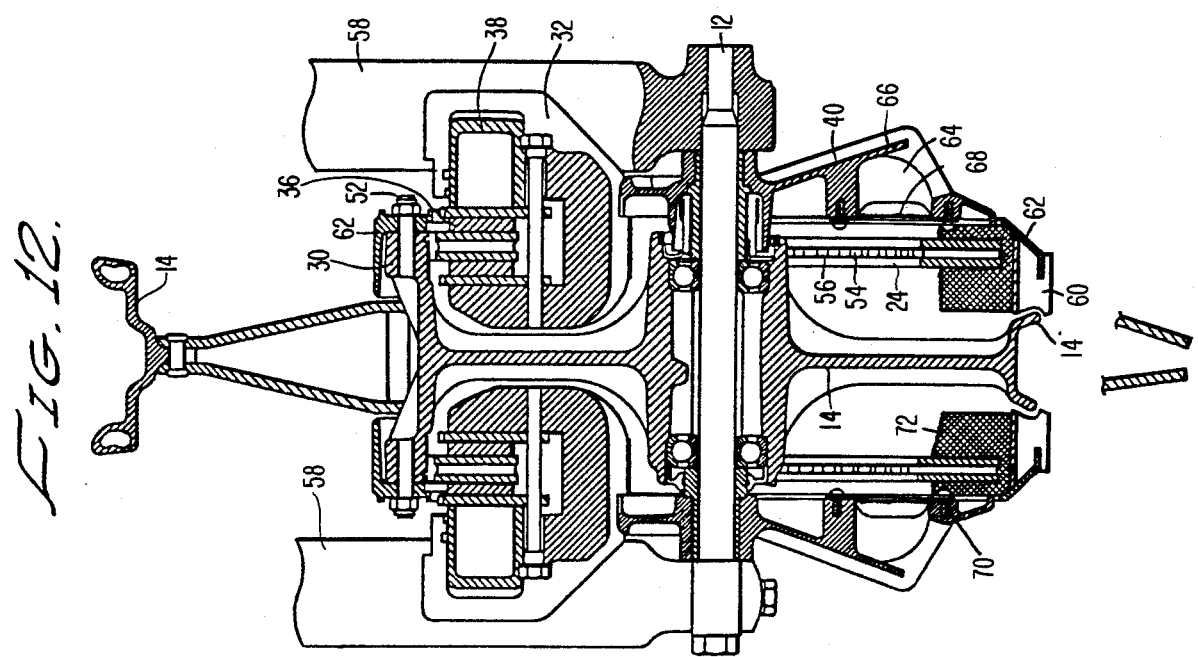
FIG. 12 is a cross-sectional view taken along line 12—12 of FIG. 11.
Figure 11:
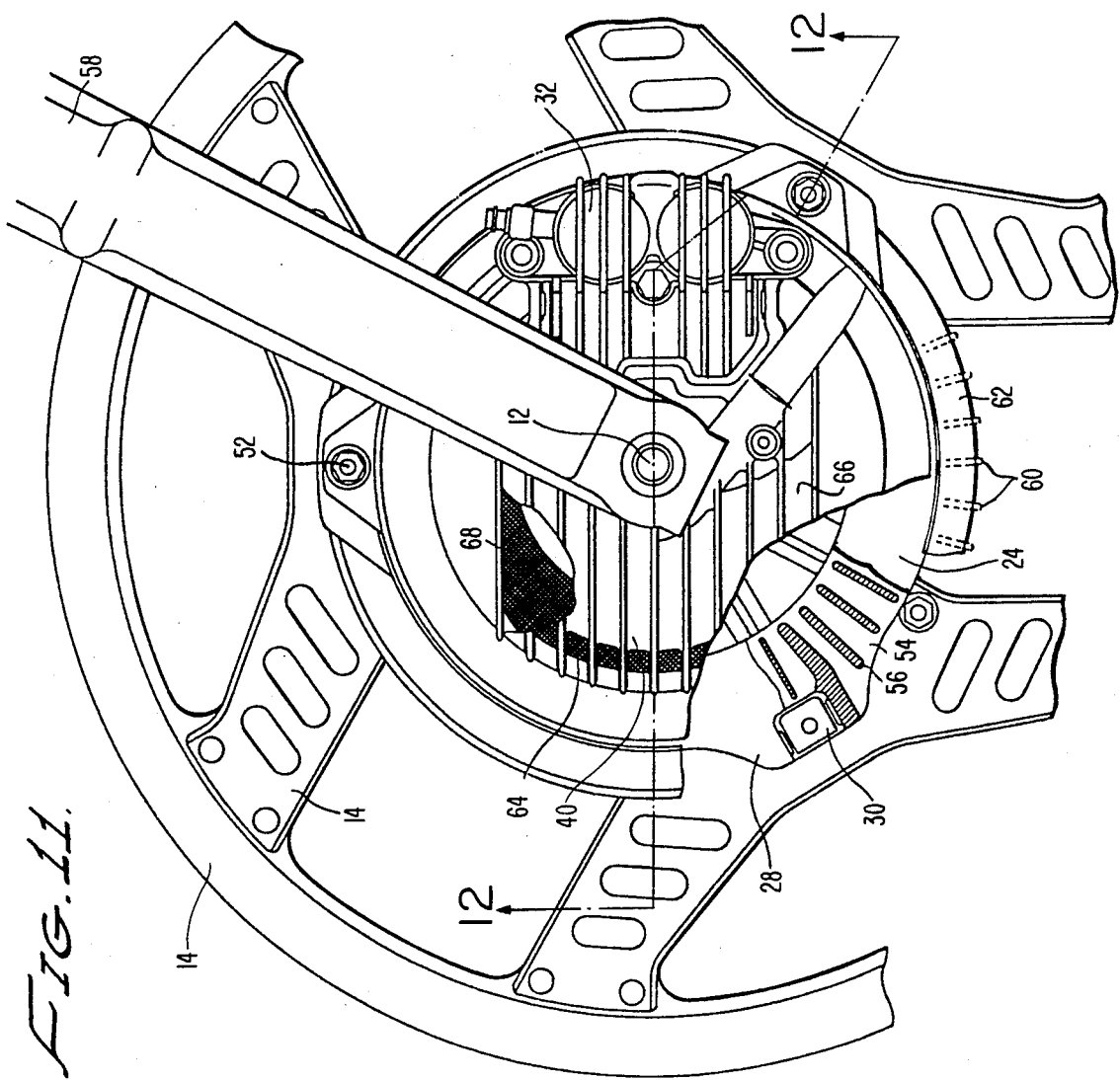
FIG. 11 is a side view of a fifth embodiment of the present invention.

FIGS. 11 and 12 disclose an embodiment which, like the embodiment of FIGS. 9 and 10, include vanes 60 associated with a shroud 62. The shroud 62 is fixed to the hub 14 such that it can rotate therewith causing the vanes 60 to forcefully draw air outwardly in a radial direction from the shielded area around the disc 24. The embodiment of FIGS. 11 and 12 is a front hub 14 and front suspension 58 of a motorcycle. Conveniently, two discs 24 are employed with two side panels 40 and two caliper members 32.

With the side panels 40, a cavity or shielded area is defined within which the discs rotate. The vanes 60 and shrouds 62 complete the closure with apertures for the flow of air in a radial direction. Air is received inwardly of the discs 24 through cooling air introduction ports 64. As can best be seen in FIG. 11, ports 64 face directly forward. As can best be seen in FIG. 12, the ports also extend outwardly of the leading profile of the disc system by means of angled panels 66 extending into the wind stream around the hub. The embodiment disclosed in FIGS. 11 and 12 thus enhances cooling of the discs 24 by means of the air ram effect of the angled panels 66, the radial pumping effect of the vanes 60, and the centrifugal cooling both through the internal passages 54 of the disc and about the disc resulting from rotation thereof.

The side panels 40 are intended as a mechanism for protecting the braking system from dirt, water and the like. Further to this end, screening material may be employed in strategic locations. Screening members 68 are fixed by means of fasteners 70 to the panels 40 across the ports 64. The mesh size and construction of the screening members 68 are best determined by the material to be excluded. In the embodiment of FIGS. 11 and 12, conventional screening material is illustrated. The screening members 68 prevent the introduction of material in the air which might otherwise be introduced into the braking cavity defined by the side panels 40 through the ports 64.

About the inner side of the fans formed by blades 60 and adjacent the root of each vane 60 are screening members 72. Screening members 72 form a protective particle barrier for the apertures between the vanes 60. The screening members 72 may be held in place by fasteners (not shown). The centrifugal force asserted on the screening members 72 when the wheel is in motion also tends to maintain the screening members 72 in position.

Looking to the embodiments of FIGS. 13, 14 and 15, reference is made, for example, to the device of FIGS. 2 and 3. Rather than a flange 42 located on the hub 14 to form the peripheral closure as in FIG. 5, a cover 74 is fixed by means of fasteners 76 to each of the side panels 40. The cover extends generally inwardly to a position adjacent the hub 14 but spaced therefrom because of the relative motion between the hub and the cover 74.

The cover 74 is specifically designed to effect a closure of the volume surrounding the discs 24. However, air flow past the discs 24 is also accommodated by apertures 78. The appertures 78 are disposed in an annular arrangement around the periphery of the discs 24. To further avoid contaminants within the brake disc cavity, the apertures 78 include screens 80 which may be individually arranged over each aperture 78 or may simply extend continuously along the inner surface of the covers 74. With the ram effect provided by the ports 64 and the rotational motion of the discs 24, air flow will be induced to flow outwardly through the apertures 78 without the addition of any rotating vanes such as in the embodiment of FIGS. 11 and 12.

Figure 18:
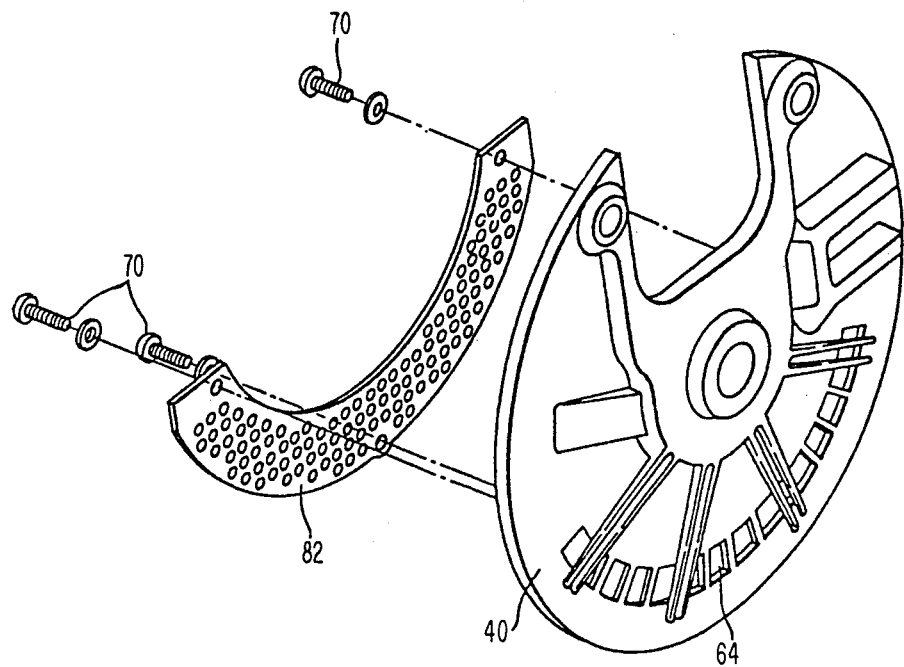
FIG. 18 is an exploded perspective view of a simplified side panel illustrating the screening material of FIGS. 16 and 17.

Turning lastly to the embodiment of FIGS. 16, 17 and 18, a hub and braking mechanism is illustrated which conforms substantially to the embodiment of FIGS. 11 and 12 with the exception that the screening mechanism, provided by screening members 68 and 72 in the aforementioned embodiment, are replaced by perforated plates 82 and 84. The perforated plate 82 is fixed by means of fasteners 70 to the side panel 40 as can best be seen in the simplified drawing of FIG. 18. The perforated plates 82 are designed to effectively screen larger material which might enter through the ports 64 than the screens of the earlier embodiment. This is equally true of the perforated plates 84 which are arranged against the roots of vanes 60 in the same manner as the screen of FIGS. 11 and 12.

Thus, through the embodiments of the present invention disclosed above, both weight and size reduction can be achieved with shielded disc brake systems without compromising cooling requirements. While embodiments and applications of this invention have been shown and described, it would be apparent to those skilled in the art that many more modifications are possible without departing from the invention concepts herein described. The invention, therefore, is not to be restricted except by the spirit of the appended claims.

I claim:

1. A disc brake system for a motorcycle having a wheel hub, said disc brake system including a brake disc having spaced parallel plates and a plurality of radial ribs connecting said plates, said ribs defining radially extending cooling passages therebetween, fixed on one side thereof to rotate with said hub, a caliper member fixed to the motorcycle for braking engagement with both sides of said brake disc, and a side panel covering said brake disc on the other side thereof and having a cutout for said caliper member and a cooling air introduction port, wherein the improvement comprises means for inducing radial, outward air flow, said air flow inducing means being radially adjacent to the periphery of said brake disc and fixed to rotate with the hub, and a screening member radially adjacent to the periphery of said brake disc and extending substantially across said air flow inducing means.

2. A disc brake system for a motorcycle having a wheel hub, said disc brake system comprising:
   a brake disc having spaced parallel plates and a plurality of radial ribs connecting said plates, said ribs defining radially extending cooling passages therebetween, fixed on one side thereof to rotate with said hub;

a caliper member fixed to the motorcycle for braking engagement with both sides of said brake disc;

a side panel covering said brake disc on the other side of said brake disc from said hub and defining an annular opening between said side panel and the hub radially adjacent to the periphery of said brake disc; and a cover fixed to said side panel and extending across said annular opening, said cover including annularly disposed apertures therethrough.

3. The disc brake system of claim 2 further comprising screening means positioned across said apertures.

4. A disc brake system for a motorcycle having a wheel hub, said disc brake system comprising a brake disc having an outer periphery and an inner periphery, said inner periphery forming an inner clearance to provide air receiving space, said brake disc fixed at said outer periphery to rotate with said hub said brake disc having spaced parallel plates and a plurality of radial ribs connecting said plates, said ribs defining radially extending cooling passages therebetween;

a caliper member fixed to the motorcycle within said inner clearance of said brake disc and engaging both sides of said brake disc for braking engagement with said brake disc;

a side panel covering said brake disc on the other side of said disc from the hub, said side panel including a cooling air introduction port radially inwardly of the braking surfaces of said brake disc, said cooling air introduction port opening forwardly relative to the motorcycle for air ram effect when moving;

means for inducing radial outward air flow radially adjacent to the periphery of said brake disc, said air flow inducing means including a fan located radially adjacent to said outer periphery of said brake disc and fixed to rotate with said hub, and a first screening member across said cooling air introduction port.

5. The disc brake system of claim 4 further including a second screening member being radially adjacent to the periphery of said brake disc across said air flow inducing means.

6. The disc brake system of claim 5 wherein said first screening member and said second screening member are mesh screens.

7. The disc brake system of claim 5 wherein said first screening member and said second screening member are perforated plates.

8. A disc brake system for a motorcycle having a wheel hub, said disc brake system comprising a brake disc having spaced parallel plates and a plurality of radial ribs connecting said plates, said ribs defining radially extending cooling passages therebetween, said brake disc having an outer periphery and an inner periphery, said inner periphery forming an inner clearance to provide air receiving space, said brake disc fixed at said outer periphery to rotate with the hub, a caliper member fixed to the motorcycle within said inner clearance of said brake disc and engaging both sides of said brake disc for braking engagement with said brake disc, a side panel covering said brake disc on the other side of said disc from the hub, said side panel including a cooling air introduction port radially inwardly of the braking surfaces of said brake disc, said cooling air introduction port opening forwardly relative to the motorcycle for air ram effect when moving, and an inlet screening member covering said cooling air introduction port opening.

9. The disc brake system defined in claim 8 wherein said brake disc includes a radial flow fan means for inducing radial outward air flow, said disc brake system further including an outlet screening member radially adjacent to the periphery of said brake disc across said means for inducing radial outward air flow.

* * * * *